UNITED STATES PATENT OFFICE.

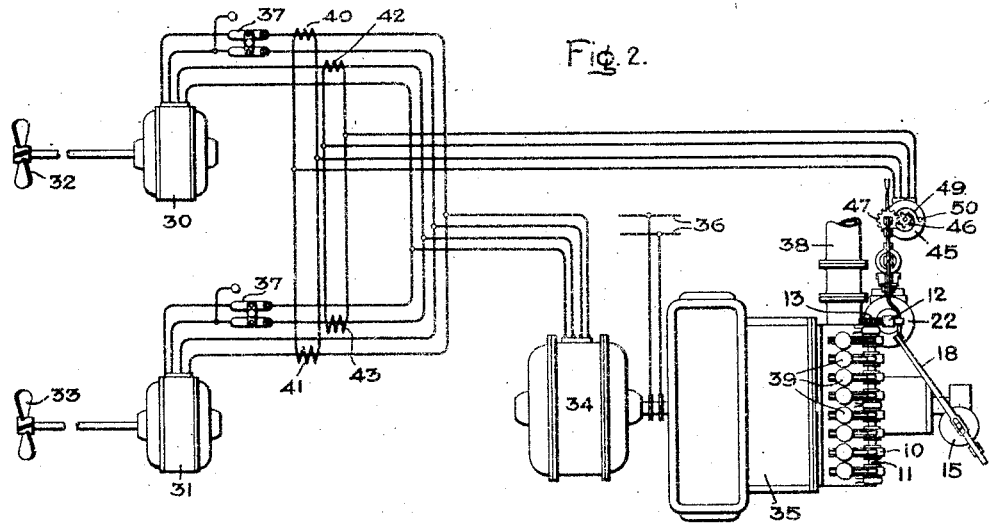

WILLIAM L. R. EMMET, OF SCHENECTADY, NEW YORK, ASSIGNOR TO GENERAL ELECTRIC COMPANY, A CORPORATION OF NEW YORK.

SHIP PROPULSION.

1,270,134.  Specification of Letters Patent.  Patented June 18, 1918.

Application filed April 5, 1916. Serial No. 89,018.

*To all whom it may concern:*

Be it known that I, WILLIAM L. R. EMMET, a citizen of the United States, residing at Schenectady, in the county of Schenectady, State of New York, have invented certain new and useful Improvements in Ship Propulsion, of which the following is a specification.

My invention relates to ship propulsion and particularly to systems of ship propulsion in which the propellers are driven by electric motors. The object of the invention is generally the provision of certain improvements in propelling equipments for vessels, and more particularly the provision of an improved electric propelling equipment and especially an improved electric equipment in which the propellers are driven by alternating current electric motors. Other objects of the invention will be brought out in the course of the following description.

When ships, having screws on both sides which are operated by separate turbines or engines, are steered by movements of the rudder, every movement of the rudder tends to cause a variation in the relative propeller speeds of the two sides, the propellers on the concave side of the turning curve slowing down and those on the convex side speeding up. If by suitable steam admission the engines on the two sides of the ship are held at equal speeds, the load on the engine which drives a propeller on the concave side of the turning curve will become greater than that on the convex side and the aggregate load on both engines will exceed that experienced with the same propeller speed with the helm amidships. Experiments with twin screw engine-driven battleships having large low speed propellers have shown that the variations of load under such conditions are very large, and that such variations of load between propellers may cause serious difficulties in equipments in which the propellers are driven by alternating current motors supplied with electric energy from the same generator. For purposes of explanation I will take the case of an equipment having propeller-driving induction motors connected to the same generator. Such motors normally operate nearly in synchronism with the generator and can only deliver their maximum torques when near to synchronism. If the maximum torque of a propeller-driving motor is exceeded by the demand on the propeller, the motor will drop out of step, that is, it will fall away from a speed nearly synchronous with the generator and will stop or operate at some lower speed, thus drawing a very large current from the generator and exerting a small torque upon the propeller. Such dropping out of step of a propeller-driving motor on either side of the ship is in practice very objectionable and might seriously hamper the control of the ship during the interval of time necessary to again establish the proper speed relations between the motors and generator. Such reëstablishment of the speed relations will generally call for intelligent action by the men handling the propelling machinery and since this might not be forthcoming in such an emergency, it is extremely desirable to provide automatic means by which the steering of the ship cannot impose such excess torque upon any of the propeller-driving motors.

The principal aim of my present invention is, accordingly, the provision of suitable means for minimizing the objectionable effects on the propelling equipment which result from a substantial difference in load between propellers on opposite sides of the ship. In other words, the aim of my present invention is to overcome any objectionable disturbances in the propelling equipment when the direction of the ship's motion is altered. In carrying out the invention I provide means for limiting or decreasing the admission of elastic fluid to the prime mover of the propelling apparatus upon the occurrence of a substantial difference in load between propellers on opposite sides of the ship, and in another aspect of the invention I provide means for limiting or decreasing the admission of elastic fluid to the prime mover when the direction of the ship's motion is altered. Thus, in its broadest aspect my present invention consists in limiting the amount of power that can be supplied to propellers on opposite sides of a ship when the direction of the ship's motion is altered, or in other words when the motion of the ship is in the arc of a circle. In those forms of my invention which I shall hereinafter particularly describe for the purpose of explanation, the propellers on opposite sides of the ship are driven by electric motors receiving electric energy from a turbo-generator and, in accordance with the present invention, means are provided for preventing an increased admission of motive fluid to the turbine to meet an increased load on either of the propeller-driving motors when the direction of the ship's motion is altered, that is, when the ship is moving in the arc of a circle. Preferably, the speed of the propeller-driving motors is controlled by an adjustable speed governing mechanism, as hereinafter more particularly explained, and my present invention can be very advantageously carried out by automatically lowering the speed limit of this mechanism whenever the ship moves in the arc of a circle. This automatic adjustment of the governing mechanism for a lower speed limit can be made in response to changes in load of the propellers or of the propeller-driving motors, or can be made by the rudder or the steering apparatus of the ship, or in any other suitable manner.

The novel features which I believe to be patentably characteristic of my invention are definitely indicated in the claims appended hereto. The principle and mode of operation of the invention together with certain of the many forms the invention may take in practice will be better understood from the following description taken in conjunction with the accompanying drawings, in which:

Figure 1 diagrammatically illustrates one form of the invention; Figs. 2 and 3 illustrate a modified arrangement of apparatus for carrying out the invention; and Fig. 4 illustrates a further modification of the invention.

The accompanying drawings diagrammatically illustrate three of the many forms which my invention may assume in practice. In the arrangement of Fig. 1 the prime mover which drives the generator is provided with an adjustable speed governing mechanism adapted to automatically hold any desired speed within the usual limits of the ship's action, and in combination with this governing mechanism means are provided which operate to limit the admission of motive fluid to the prime mover for any setting of the governor, but which at the same time do not interfere with the supply of a diminished quantity of motive fluid to the prime mover. In the arrangement of Figs. 2 and 3 suitable electrodynamic means responsive to a difference in load of two propeller-driving motors on opposite sides of the ship is provided for decreasing the supply of motive fluid to the prime mover, while in the arrangement of Fig. 4 movements of the ship's rudder are employed to decrease the supply of motive fluid to the prime mover.

Referring first to Fig. 1 of the drawings, there is diagrammatically represented an adjustable speed governing mechanism of the type described in my U. S. Letters Patent 1,137,308, dated Apr. 27, 1915. The supply of elastic fluid to the turbine of a turbo-alternator, not shown in this figure, is controlled by a series of valves which are operated in the usual manner by a corresponding series of cams 10 mounted on a rotatable cam shaft 11. The cam shaft is adapted to be rotated by means of a rack 12 and pinion 13. A suitable governor or other speed responsive device 15 is operatively connected to the shaft of the turbine. The governor shown in the drawings is of the centrifugal type and comprises the weights 16, the spring 17, and the lever 18, which latter is pivoted at one end to the casing of the governor. A resilient link such as a spring 19 operatively connects the other end of the lever 18 to one end of a floating lever 20. The floating lever 20 is operatively connected to the piston of a pilot valve 21 for a hydraulic motor 22. The piston 23 of the hydraulic motor carries at its upper end the rack 12. The fulcrum F of the floating lever 20 can be adjusted by means of an operating rod 24 and in this manner the governing mechanism can be set to maintain the speed of the turbine constant, within the usual narrow limits, at any speed required in the navigation of the ship. The principle of operation and the details of construction of this adjustable speed governing mechanism is fully described in my aforementioned patent and need not be considered in further detail herein.

In accordance with my present invention a lever 25 having a fixed pivot 26 is connected at one end to the operating rod 24. The other end of the lever 25 carries a projection 27 which operates to limit the movement in one direction of the floating lever 20. Whenever the operating rod 24 is moved to adjust the fulcrum F, the lever 25 is correspondingly moved and the projection 27 takes up a position such that movement of the lever 20 in response to the action of the governor 15 upon a decrease in the speed of the turbine is limited. In other words, the projection 27 is so positioned that for any setting of the governing mechanism the mechanism is free to diminish the supply of elastic fluid to the turbine whenever the load on the turbine decreases, but is not free to increase the supply of elastic fluid to the turbine when the load on the turbine increases. This provision alone, since it prevents any increase of aggregate load reduces the excess load which would be thrown on the most heavily loaded propeller and thus diminishes the tendency of the propeller-driving motor to break down. The projection 27 thus limits the amount of elastic fluid that can be admitted to the turbine for any setting of the governing mechanism by the operating rod 24, which limit is slightly above the admission normally corresponding to that setting of the mechanism.

Referring now to Fig. 2 of the drawings, 30 and 31 represent two propeller-driving induction motors located on opposite sides of the ship. The rotors of the motors 30 and 31 are connected to propellers 32 and 33, respectively. The motors 30 and 31 are adapted to be supplied with electric energy from a quarter phase alternating current generator 34. The alternator is directly coupled to an elastic fluid turbine 35. The alternator is diagrammatically represented as of the revolving field type and is adapted to have its field winding energized from any suitable direct current source, such as the mains 36. Reversing switches 37 are shown in the circuits of each of the motors for reversing their phase relations. While I have shown a quarter phase system it will of course be understood that my invention is equally applicable to any other polyphase system.

The turbine 35 is adapted to be supplied with elastic fluid by means of a main supply pipe 38. The pipe 38 is connected to the source of elastic fluid, such as the steam boilers of the ship. The admission of elastic fluid to the turbine is controlled by a compound valve comprising a series of admission valves indicated generally at 39. Movement of these valves is effected by the cams 16 on the rotatably mounted cam shaft 11. The connection of the cam shaft to the governor 15 of the turbine and to the operating rod 24 is just the same as explained in connection with Fig. 1, and is shown in detail in Fig. 3. Corresponding elements in these three figures are indicated by the same reference character.

Electric current transformers 40 and 41 are connected in the leads of one phase of the motors 30 and 31, respectively, while current transformers 42 and 43 are connected in the other phase of the motors 30 and 31, respectively. The secondary windings of the transformers 40 and 41 are connected in series, as are also the secondary windings of the transformers 42 and 43. A quarter phase electric motor 45 has its two phases connected across the series-connected secondary windings of transformers 40—41 and 42—43. By this connection of the motor 45 no current flows in the circuits of the motor when the currents supplied to the main motors 30 and 31 are equal, but when the currents supplied to the main motors become unequal, current will flow in the circuits of the motor 45 proportional to the difference in the currents of the main motors 30 and 31.

The shaft of the motor 45 carries a pinion 46 which meshes with a gear 47. The gear 47 is slidably mounted on a turnbuckle 48, so that the turnbuckle can slide axially through the gear and so that the gear when rotated will turn the turnbuckle. A spiral spring 49 has one end secured to a fixed pin 50 and its other end secured to the shaft of the motor 45. The spring 49 is wound up by the rotation of the motor 45 upon the flow of current in its circuits, and the spring further operates to return the motor to an initial or normal position when the motor torque falls off.

The operation of the apparatus diagrammatically represented in Figs. 2 and 3 is as follows: The fulcrum F of the speed governing mechanism is adapted to be adjusted by means of a lever 55 which is pivoted at 56 and engages a pin at the lower end of the operating rod 24. The operating rod 24 is divided into two parts which are screw-threaded into the ends of the turnbuckle 48. Movement of the lever 55 thus adjusts the fulcrum F and sets the speed governing mechanism to maintain, within the usual narrow limits, the speed of the turbine substantially constant. When the operating rod 24 is moved by the lever 55 the turnbuckle 48 slides through the gear 47. If the loads on the propeller-driving motors 30 and 31 become unequal, due to the ship moving in the arc of a circle, current will flow from the secondary windings of the current transformers to the motor 45, and a motor torque will be developed which will cause the pinion 46 to drive the gear 47, thereby rotating the turnbuckle 48 and adjusting the position of the fulcrum F of the governing mechanism. The torque of the motor 45 is always in the same direction and is such that whenever the propeller-driving motors 30 and 31 become unequally loaded the upper section of the operating rod 24 is moved by the turnbuckle so as to decrease the admission of steam to the turbine. In other words, any rotation of the gear 47 caused by the torque of the motor 45 will effect an adjustment of the fulcrum F of the floating lever for a lower speed limit of the turbine and consequently a less load on both propeller-driving motors. When the loads on the two motors 30 and 31 again become equal the torque of the motor 45 will decrease to zero and the spring 49 will then turn the pinion 46 and hence the gear 47 and turnbuckle 48 until these members have been returned to their initial or normal positions.

The spring 49 can be arranged with an initial tension so that small variations of the current between the motors 30 and 31 will cause no movement of the turnbuckle 46, and the rotation of the turnbuckle can be limited so that the motor 45 can effect only a certain maximum change of the governing mechanism for any setting of the mechanism. The spring 49 may also be so proportioned that one degree of load difference between the motors 30 and 31 will cause a small motion of the fulcrum F of the governing mechanism while a greater degree of load difference will cause a greater motion of the fulcrum.

The arrangement of the apparatus illustrated in Figs. 2 and 3 is such that the supply of elastic fluid to the turbine is not decreased until an actual difference in the loads of the two propeller-driving motors has occurred. In certain cases it may be desirable to decrease the supply of elastic fluid to the turbine before an actual difference in load of the motors on the two sides of the ship occurs, or in other words, to anticipate such a difference in the loads of the motors on the two sides of the ship. This result may be accomplished by adjusting the fulcrum F of the speed governing mechanism for a lower speed limit whenever the rudder of the vessel is turned from its amidships position. This form of the invention is diagrammatically illustrated in Fig. 4 of the drawings. The rudder 70 is pivoted at 71 and is adapted to be moved to one side or the other by any suitable form of steering apparatus. The rudder 70 is operatively connected by linkage 71 to a cam 72 pivoted at 73. A cam follower 74 is operatively related to the cam surface of the cam 72 and is carried on an arm 74' extending from the manually operable speed control lever 55'. The lever 55' is pivoted at 75 and operatively engages the operating rod 24 of the speed governing mechanism. The operation of this apparatus is such that the operating rod 24 can be freely moved through its usual range of movement by the lever 55'. Whenever the rudder 70 is turned by the steering apparatus the cam 72 engages the cam follower 74 and moves the operating rod 24 so as to decrease the speed which the governing mechanism is adjusted to maintain. It will be observed that movement of the rudder 70 to either side to its amidships position causes the operating rod 24 to move in the same direction, so that the supply of elastic fluid to the turbine is always decreased whenever the rudder is moved to one side or the other of its amidships position.

I have herein shown and particularly described certain embodiments of my invention for the purpose of explaining its principle and showing its application, but numerous modifications of the details of construction and arrangement of these embodiments and other applications will present themselves to those skilled in the art. I, therefore, wish to cover by the following claims all modifications within the spirit of the invention.

What I claim as new and desire to secure by Letters Patent of the United States, is:—

1. A system of ship propulsion comprising an elastic fluid turbine, an alternating current generator coupled to said turbine, a propeller on each side of the ship, an alternating current motor coupled to each propeller and adapted to be electrically connected to said generator, an adjustable speed governing mechanism for approximately maintaining any normal operating speed of the turbine, and means for preventing an increased admission of elastic fluid to said turbine to meet an increased load on either of said motors when the ship's motion is in the arc of a circle.

2. A system of ship propulsion comprising an elastic fluid turbine, an electric generator coupled to said turbine, a propeller on each side of the ship, an electric motor coupled to each propeller and adapted to be electrically connected to said generator, an adjustable speed governing mechanism for approximately maintaining any normal operating speed of the turbine, and means for limiting the supply of elastic fluid to said turbine when the motion of the ship in the arc of a circle causes one motor to carry a considerably greater load than the other motor.

3. A system of ship propulsion comprising a prime mover, a source of motive fluid for said prime mover, an electric generator coupled to said prime mover, a propeller on each side of the ship, an electric motor coupled to each propeller and adapted to be electrically connected to said generator, an adjustable speed governing mechanism for approximately maintaining any normal operating speed of said prime mover, and means for decreasing the supply of motive fluid to said prime mover when the motion of the ship is in the arc of a circle.

4. A system of ship propulsion comprising a prime mover, a source of motive fluid for said prime mover, an electric generator coupled to said prime mover, a propeller on each side of the ship, an electric motor coupled to each propeller and adapted to be electrically connected to said generator, an adjustable speed governing mechanism for approximately maintaining any normal operating speed of said prime mover, and means responsive to a change in the distribution of load between said electric motors resulting from a change in the direction of motion of the ship for decreasing the supply of motive fluid to said prime mover.

5. A system of ship propulsion comprising a prime mover, a propeller on each side of the ship adapted to be driven by power developed by said prime mover, an adjustable speed governing mechanism for approximately maintaining any normal operating speed of said prime mover, and means for limiting the power developed by said prime mover upon a change in the direction of motion of the ship.

6. A system of ship propulsion comprising a prime mover, a propeller on each side of the ship adapted to be driven by power developed by said prime mover, an adjustable speed governing mechanism for approximately maintaining any normal operating speed of said prime mover, and means responsive to a change in the distribution of load between said propellers resulting from a change in the direction of motion of the ship for adjusting said speed governing mechanism for a lower speed limit.

7. A system of ship propulsion comprising a prime mover, a source of motive fluid for said prime mover, a propeller on each side of the ship adapted to be driven by power developed by said prime mover, an adjustable speed governing mechanism for approximately maintaining any normal operating speed of said prime mover, and means for decreasing the supply of motive fluid to said prime mover upon a change in the direction of motion of the ship.

8. A system of ship propulsion comprising an elastic fluid turbine, an electric generator coupled to said turbine, a propeller on each side of the ship, an electric motor coupled to each propeller and adapted to be electrically connected to each generator, an adjustable speed governing mechanism for approximately maintaining any normal operating speed of said turbine, and means for adjusting said speed governing mechanism for a lower speed limit upon a change in the direction of motion of the ship.

9. A system of ship propulsion comprising a prime mover, a source of motive fluid for said prime mover, an electric generator coupled to said prime mover, a propeller on each side of the ship, an electric motor coupled to each propeller and adapted to be electrically connected to said generator, and means responsive to a substantial difference in load between the motors on the two sides of the ship for effecting a partial shutting off of the supply of motive fluid to said prime mover.

10. A system of ship propulsion comprising a prime mover, an alternating current generator coupled to said prime mover, a propeller on each side of the ship, an alternating current motor coupled to each propeller and adapted to be electrically connected to said generator, an adjustable speed governing mechanism for approximately maintaining any normal operating speed of said prime mover, and means responsive to a substantial difference in load between the motors on the two sides of the ship for adjusting said speed governing mechanism for a lower speed limit.

11. A system of ship propulsion comprising a prime mover, an electric generator coupled to said prime mover, a propeller on each side of the ship, an electric motor coupled to each propeller and adapted to be electrically connected to said generator, an adjustable speed governing mechanism for approximately maintaining any normal operating speed of said prime mover, electrodynamic means responsive to a predetermined unbalancing of the currents supplied to said motors by said generator, and means operatively connecting said electrodynamic means to said speed governing mechanism.

12. A system of ship propulsion comprising an elastic fluid turbine, an alternating current generator coupled to said turbine, a propeller on each side of the ship, an alternating current motor coupled to each propeller and adapted to be electrically connected to said generator, an adjustable speed governing mechanism for approximately maintaining any normal operating speed of said turbine, an auxiliary electric circuit electrically associated with said motors and adapted to carry a current upon the occurrence of a predetermined unbalancing of the currents supplied to said motors by said generator, and electrodynamic means included in said auxiliary circuit and operatively connected to said speed governing mechanism.

13. A system of ship propulsion comprising a prime mover, a source of motive fluid for said prime mover, a propeller on each side of the ship adapted to be driven by power developed by said prime mover, an adjustable speed governing mechanism for approximately maintaining any normal operating speed of said prime mover, and means associated with said speed governing mechanism for preventing an increased admission of motive fluid to said prime mover to meet an increased load on either of said propellers when the direction of the ship's motion is altered.

14. A system of ship propulsion comprising a prime mover, a source of motive fluid for said prime mover, a propeller on each side of the ship adapted to be driven by power developed by said prime mover, an adjustable speed governing mechanism for approximately maintaining any normal operating speed of said prime mover, and means for preventing an increased admission of motive fluid to said prime mover to meet an increased load on either of said propellers when the direction of the ship's motion is altered.

15. A system of ship propulsion comprising a propeller on each side of the ship, means adapted to supply power for driving said propellers, an adjustable speed governing mechanism for approximately maintaining any normal operating speed of said last mentioned means, and means for limiting the amount of power that can be supplied to said propellers by said last mentioned means when the direction of the ship's motion is altered.

In witness whereof, I have hereunto set my hand this 3rd day of April, 1916.

WILLIAM L. R. EMMET.